United States Patent [19]

Wu

[11] Patent Number: 5,349,346
[45] Date of Patent: Sep. 20, 1994

[54] REFLECTOR-WARNING TRIANGLE

[76] Inventor: Shin-Chyuan Wu, 3F., No. 6, Lane 12, Chung Ching Road, Baan Chyau City, Taipei Hsien, Taiwan

[21] Appl. No.: 87,621

[22] Filed: Jul. 1, 1993

[51] Int. Cl.⁵ .......................... E01F 9/00; G09F 13/16
[52] U.S. Cl. ................... 340/908; 116/63 T; 340/471; 340/473
[58] Field of Search .............. 116/63 T; 340/471, 472, 340/473, 908, 908.1; 40/903

[56] References Cited

U.S. PATENT DOCUMENTS

| | | | |
|---|---|---|---|
| 4,613,847 | 9/1986 | Scolari et al. | 116/63 T X |
| 4,860,177 | 8/1989 | Simms | 340/472 X |
| 4,875,028 | 10/1989 | Chou | 116/63 T X |
| 4,952,910 | 8/1990 | Straten et al. | 340/473 |
| 5,193,895 | 3/1993 | Naruke et al. | 362/249 |

*Primary Examiner*—Daniel M. Yasich
*Attorney, Agent, or Firm*—Pro-Techtor International

[57] ABSTRACT

An improved structure of reflective warning triangle which has many holes inside the triangle for plugging in the bright red LED's, said reflective warning triangle having a reflecting plate and a transparent plate together. Said reflective warning triangle has tight washers to seal the holes containing the LED's to achieve the goal of a water-proof device. The LED's are series-parallel connected six by six so as to keep the reflective warning triangle of the present invention shining even when part of the circuit is short-circuited.

2 Claims, 4 Drawing Sheets

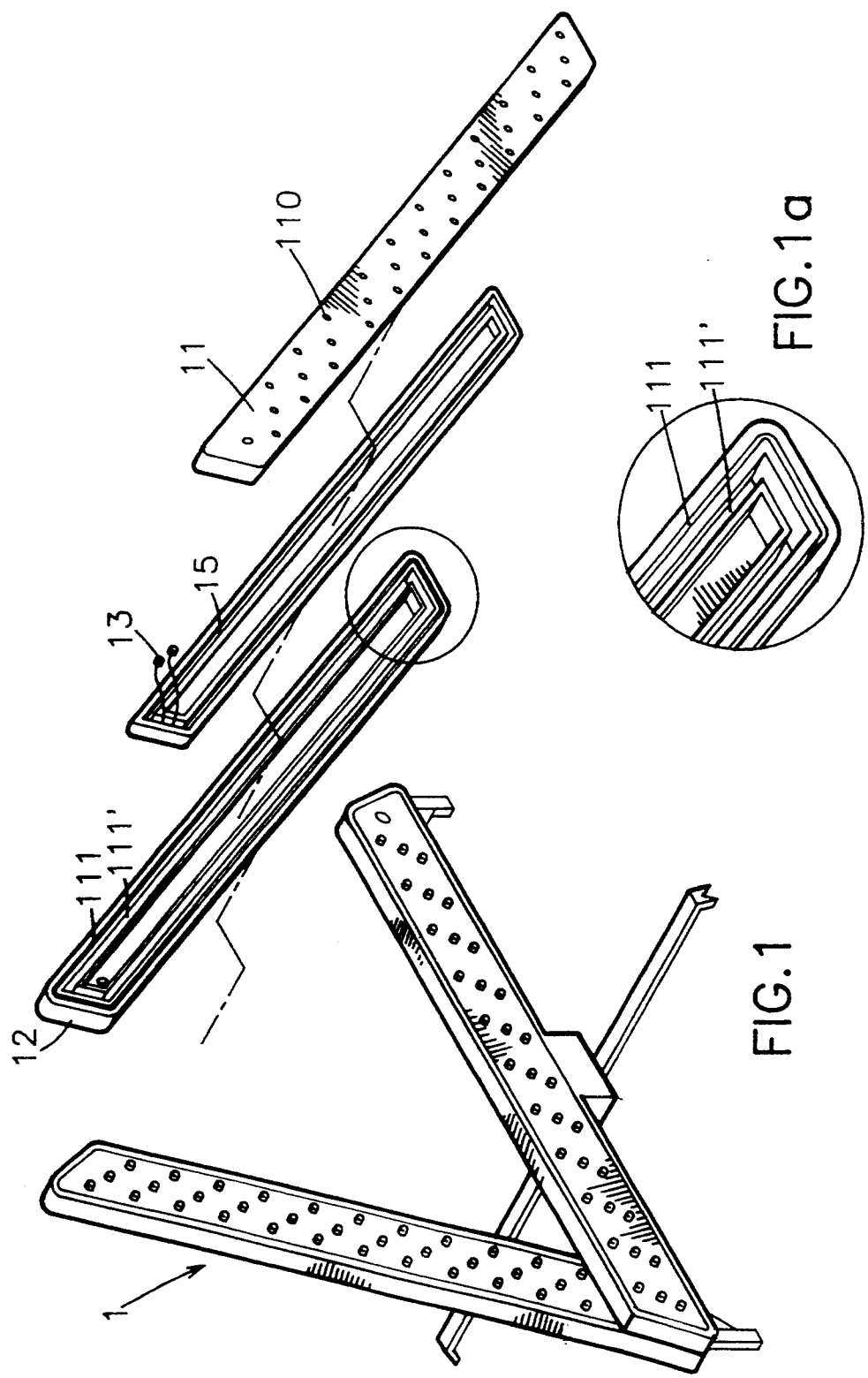

REFLECTOR-WARNING TRIANGLE

BACKGROUND OF THE INVENTION

The present invention relates to a simple three-dimensional and two-sided reflective warning triangle which is eye-catching, mobile, water-proof and easily preserved. The present invention provides an improved warning sign for a car accident, a broken-down car, or a roadblock.

The prior art warning triangle comprises a single-side plane triangle which is combined with three plates and a cross. Since the surface of which is glued with reflector paper or painted with reflector paint, the distance of reflection of the prior art reflective warning triangle is limited. Therefore, it is dangerous to use such warning triangle as the warning sign during a foggy, rainy evening.

Thus it can be seen that an improved, two-sided, three-dimensional and large sized warning triangle is needed. The present invention, which is easy to assemble and dismantle, is in the aforesaid structure. The present invention reflects further than the prior art warning sign. The mobile, water-proofed reflective warning triangle will not stop being visible even if part of the circuit is short-circuited.

SUMMARY OF THE INVENTION

The interspersed LED's 13 increase the area of simultaneous shining by protruding from reflecting plates. Therefore, the LED's can be seen directly. The LED's 13 are series-parallel connected six by six. This means that the LED's are serially connected in groups of six, with the groups being connected in parallel so as to avoid the situation that the whole circuit of the reflective warning triangle of the present invention short-circuits at the same time. Several sets of protruberances 111 of differing heights are provided around the bottom rim of the reflecting plate 12 and around the top of the transparent plate 11. A scoop channel 121 is provided around the top rim of the transparent plate 11 so that the plates connect to each other tightly. The inner space and tight gaskets inside the triangle make the present invention perfectly water-proof. The transparent plate enables the triangle to save electricity.

BRIEF DESCRIPTION OF THE DRAWINGS

FIG. 1 is a three-dimensional exploded view of a reflective warning triangle according to the present invention;

DETAILED DESCRIPTION OF THE PREFERRED EMBODIMENT

Figure 4:
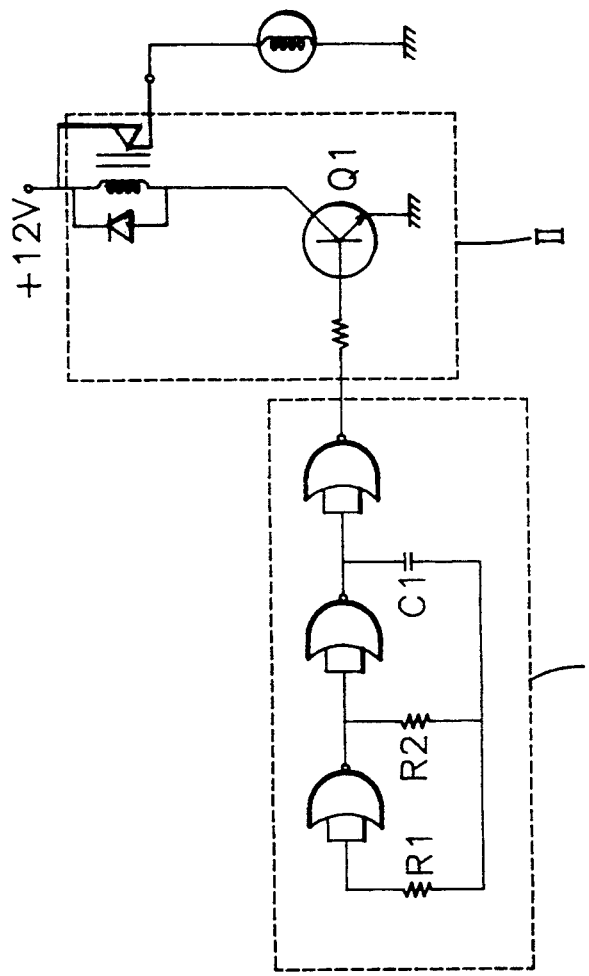
FIG. 4 is an illustration of an electric circuit according to the present invention.

Referring to the figures, an improved reflective warning triangle 1 of the present invention is comprised of two major parts, a reflecting plate 12 and a transparent plate 11. There are many holes arranged on the transparent plate 11, wherein bright red LED's 13 are situated. The LED's protrude from the holes. Several sets of circumferential protruberances 111 of differing heights are provided around the bottom rim of the transparent plate 11 and a scoop channel 121 is provided around the top rim of the reflecting plate 12 so as to connect to each other tightly. The assembly is sealed by means of a gasket 15. Three of these assemblies are then joined to form a triangle.

Figure 2:
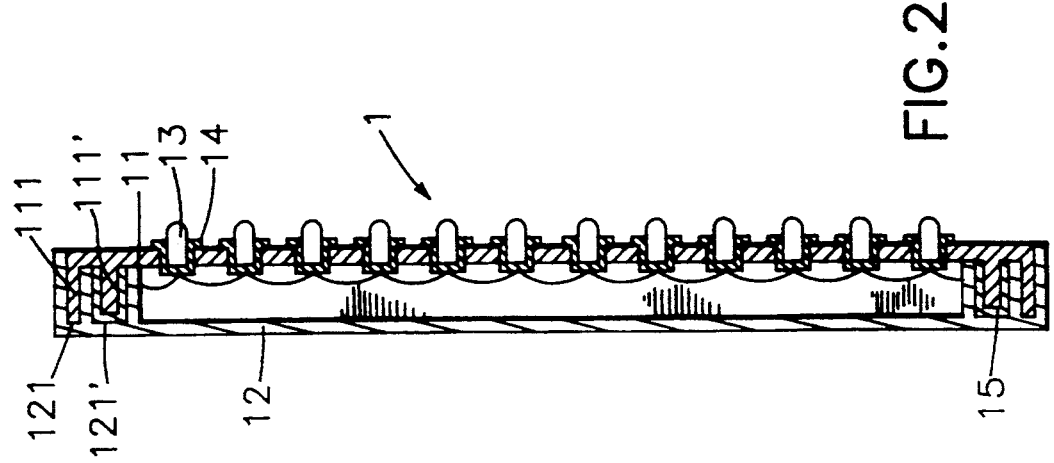
FIG. 2 is an assembly sectional view of a reflective warning triangle according to the present invention.

Referring to FIG. 2, therein it is illustrated that the reflecting plate 12 and the transparent plate 11 are connected to each other, and the inner space is sealed with the washers 14. To be cautious, injecting some silicon into the triangle will be a great help for water-proofing.

Figure 3:
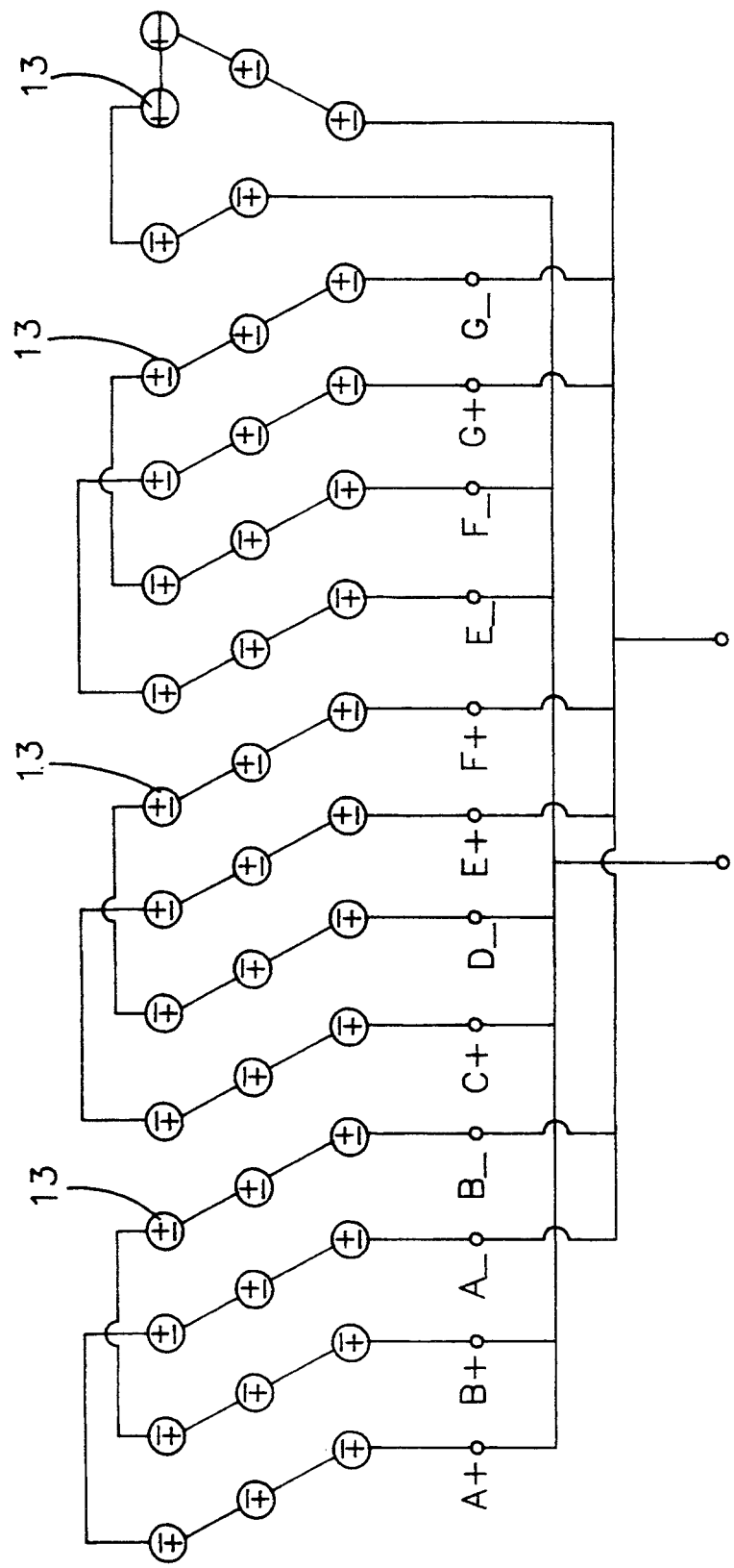
FIG. 3 is an illustration of the electric wiring according to the present invention.

Referring to FIG. 3, therein illustrated is the circuit of the reflective warning triangle according to the present invention. The LED's are series-parallel connected six by six, meaning that the LED's 13 are serially connected in multiple groups of six, and the groups are connected in parallel, so as to keep the remaining sets of LED's 13 lighted in case one set of LED's is short-circuited.

The aforesaid LED's 13 are bright red. The electric current is 20 mA and the voltage of the storage battery is 12 V. Therefore, the electricity the reflective warning triangle of the present invention needs is only around 30.24 W ($0.02A \times 12V \times 126$). The frequency of breakdown relative to the prior art will be reduced accordingly. The number of LED's of the whole triangle is 126 so as to be an obvious cautionary sign.

Figure 5:
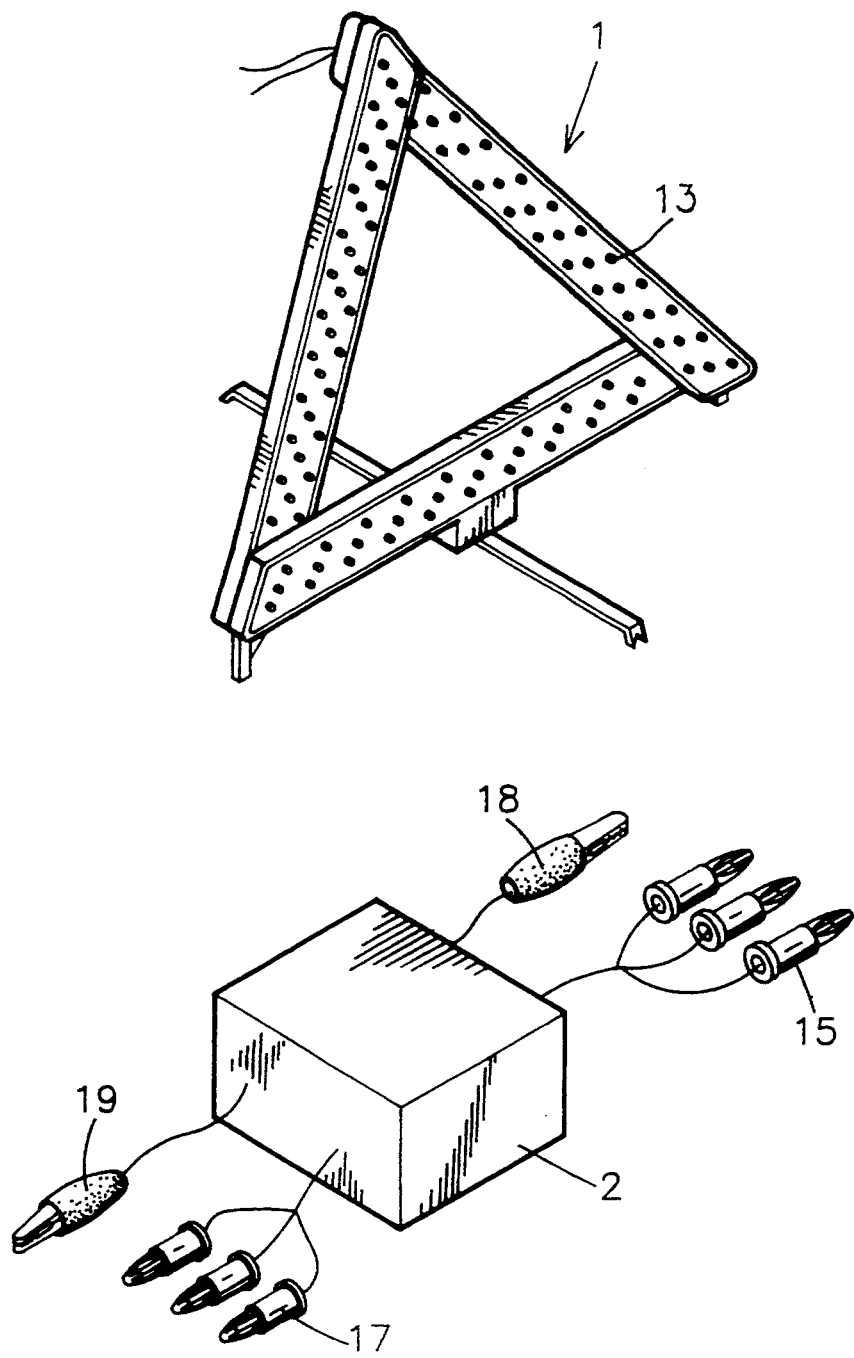
FIG. 5 is an illustration of the present invention.

Referring to FIG. 5, therein illustrated is an improved structure of reflective warning triangle of the present invention. Plugging the positive and negative plugs 16, 17 in the receptacle and the connecting devices 18, 19 in the cathode and anode of the storage battery allows the circuit to be functional. The connecting device 2 can be replaced by a car lighter adapter.

What is claimed is:

1. A reflective warning triangle comprising:
   multiple bright red LED's fixed in and protruding from holes in legs of the triangle so as to allow greater dispersal of the light emitted therefrom, the connecting points of the LED's and the triangle being sealed by multiple washers;
   the legs of the triangle comprise a reflective plate and a transparent plate, with several sets of circumferential protuberances in differing heights and a scoop channel being provided on a back of the transparent plate and a front of the reflective plate, said protuberances and channel serving as the means to join the transparent plate and the reflective plate to form the leg of the triangle, a gasket being provided intermediate the two plates to ensure proper sealing; and wherein
   said LED's are series-parallel connected to each other six by six.

2. The reflective warning triangle of claim 1 wherein:
   a connecting device and positive and negative plugs, which allow the battery and lighter of the car to serve as the source of electricity for the reflective warning triangle are installed in the reflective warning triangle.

* * * * *